United States Patent [10] Patent No.: US 8,015,866 B2
Aoki et al. (45) Date of Patent: Sep. 13, 2011

(54) LIQUID DETECTION UNIT, AND LIQUID CONTAINER

(75) Inventors: Yuji Aoki, Matsumoto (JP); Hitotoshi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 551 days.

(21) Appl. No.: 12/170,294

(22) Filed: Jul. 9, 2008

(65) Prior Publication Data

US 2009/0195573 A1 Aug. 6, 2009

(30) Foreign Application Priority Data

Jul. 10, 2007 (JP) ................................ 2007-180755
Jun. 25, 2008 (JP) ................................ 2008-165524

(51) Int. Cl.
*G01F 22/00* (2006.01)

(52) U.S. Cl. ........................................ 73/149; 73/290 V

(58) Field of Classification Search ................ 73/290 V, 73/149

See application file for complete search history.

(56) References Cited

U.S. PATENT DOCUMENTS

2006/0137447 A1 6/2006 Usui et al.
2007/0109368 A1* 5/2007 Kimura .......................... 347/86

FOREIGN PATENT DOCUMENTS

JP 2006-160371 A 6/2006

* cited by examiner

*Primary Examiner* — Hezron Williams
*Assistant Examiner* — Paul West
(74) *Attorney, Agent, or Firm* — Sughrue Mion, PLLC

(57) ABSTRACT

Disclosed is a liquid detection unit having a liquid detection chamber, a detection portion including a detection space communicating with the liquid detection chamber via a through hole of a detection portion installation member and a piezoelectric sensor which detects remaining vibrations, and a movable member including a detection space sealing surface which is urged by an urging member and thus comes to abut against one surface of a detection portion installation member. The liquid detection chamber includes an abutting surface abutting against a second sealing surface being in contact with a first sealing surface of the movable member and the detection portion installation member. When a distance between the first sealing surface of the movable member to the detection space sealing surface is defined as L1 and a distance between the second sealing surface of the liquid detection chamber to the abutting surface is defined as L2, the relationship L1>L2 is satisfied.

18 Claims, 13 Drawing Sheets

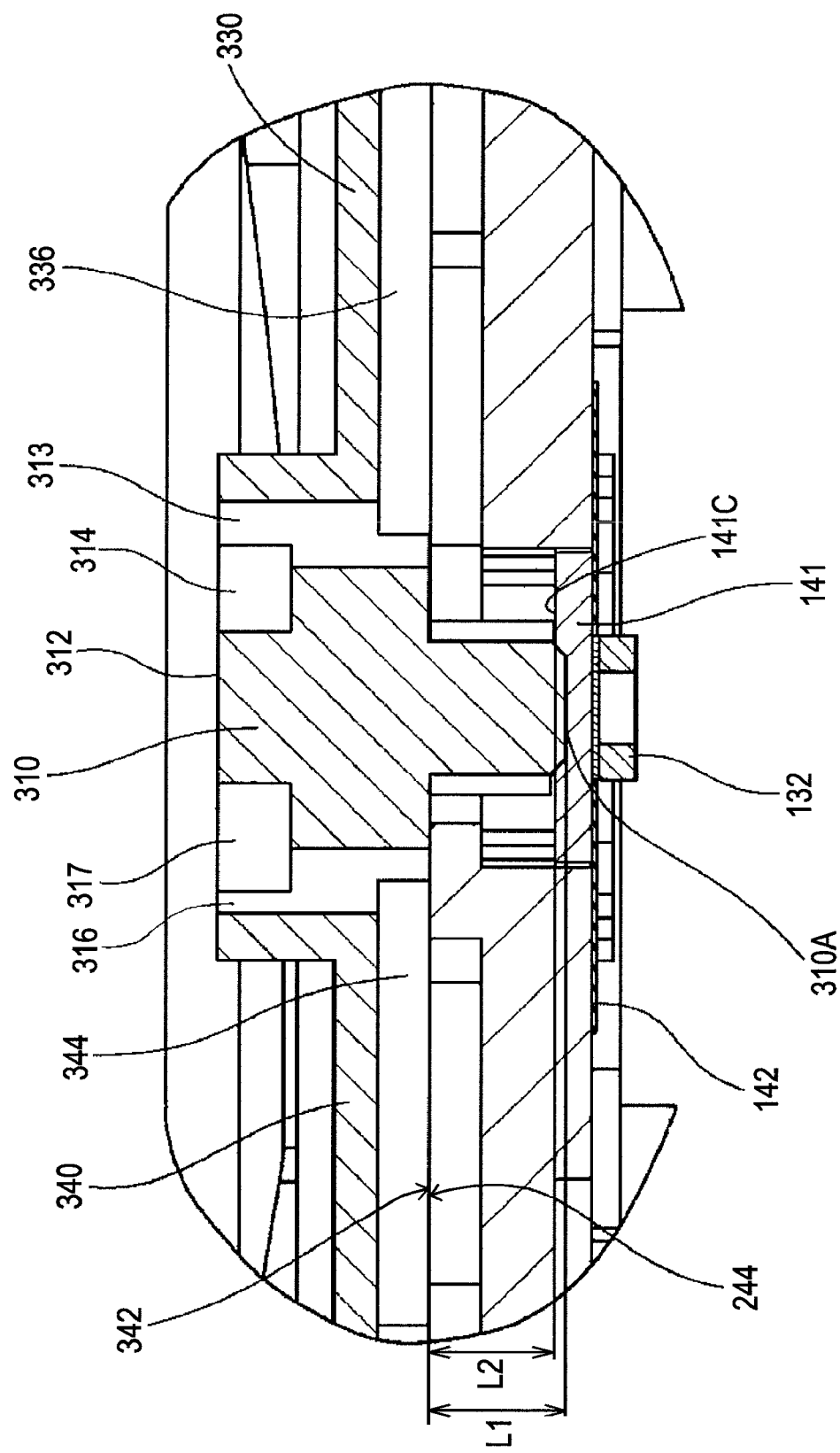

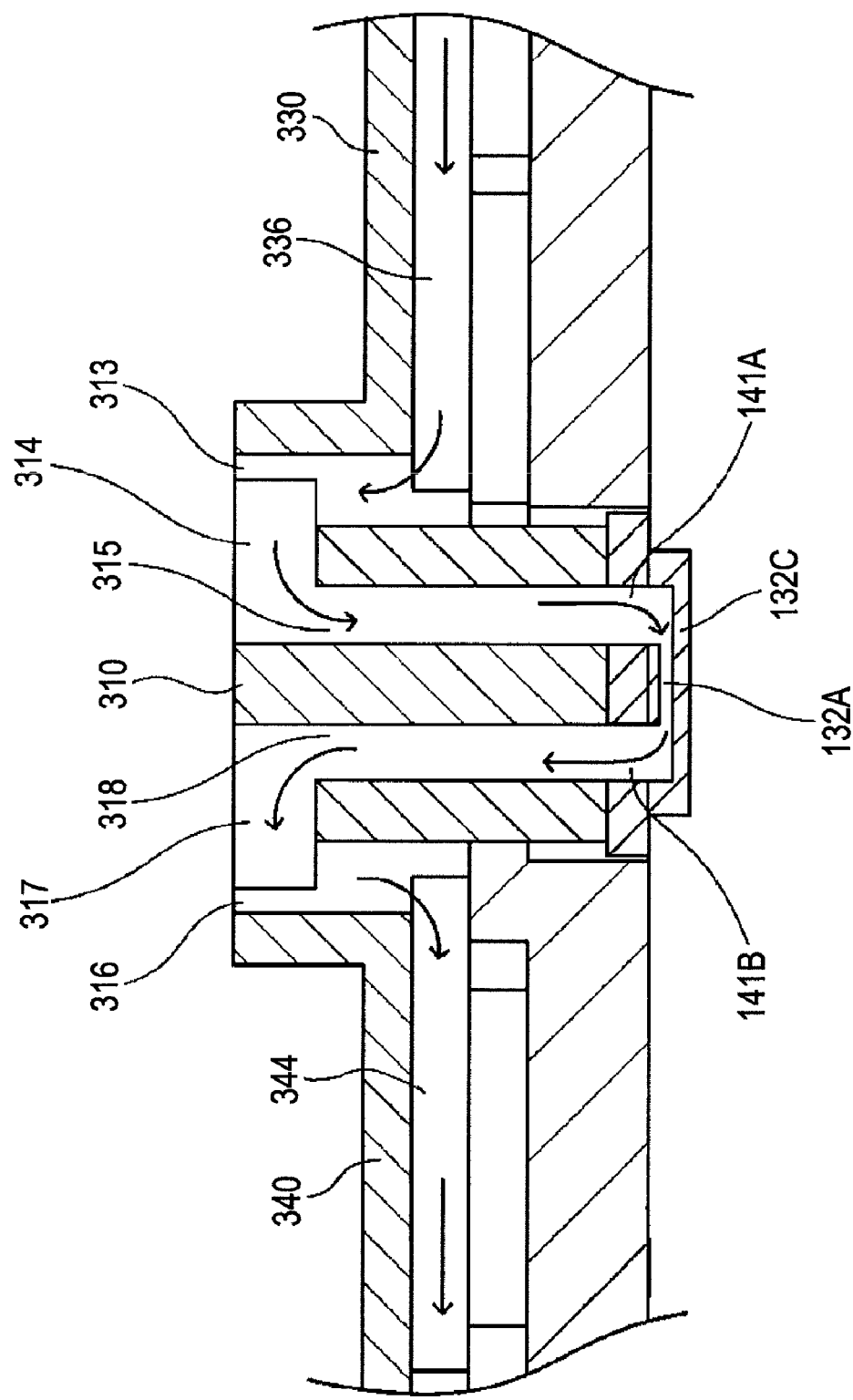

LIQUID DETECTION UNIT, AND LIQUID CONTAINER

BACKGROUND

1. Technical Field

The present invention relates to a liquid detection unit suitable for detecting residue of liquid in a liquid container and a liquid container equipped with the liquid detection unit.

2. Background Art

A technique of detecting the remaining amount of ink (liquid) in an ink cartridge (liquid container) using piezoelectric-type detection means is known (Patent document 1). According to this technique, ink end or ink near-end is detected in a manner such that a sensor constituting the piezoelectric-type detection means is provided with a sensor cavity and electrical characteristic of the piezoelectric-type detection means changes according to presence of ink in the sensor cavity.

Patent Document 1: JP-A-2006-160371

Unlike the technique of Patent document 1, when trying to detect ink end or ink near-end in the state in which the sensor cavity is always filled with ink, it is important to assure that the sensor cavity is completely filled with ink. That is, when the sensor cavity is not completely filled with ink, the result of false detection comes out.

SUMMARY

According to some aspects of the invention, an object of the invention is to provide a liquid detection unit in which a sensor cavity is surely filled with liquid when the liquid is introduced into the liquid detection unit for the first time, and there is also provided with a liquid container equipped with the liquid detection unit.

The liquid detection unit of the invention includes a liquid detection chamber including a liquid inlet, a liquid outlet, a flexible diaphragm which is displaced according to liquid pressure between the liquid inlet and the liquid outlet, and a detection portion installation member having a surface facing the diaphragm, a volume of the liquid detection chamber changing the volume according to the liquid pressure; a movable member provided in the liquid detection chamber; a detection portion including a detection space which communicates with the liquid detection chamber and is separated from the liquid detection chamber by the detection portion installation member, and a piezoelectric-type sensor which causes the detection space to vibrate and detects a remaining vibration waveform of vibrations, the detection portion being provided on the other surface of the detection portion installation member; an urging member which urges the movable member toward the detection portion installation member; and a piece of flexible film which is fixed to the liquid detection chamber and holds the detection portion installation member, in which the movable member includes a pressure receiving plate attached to the diaphragm and the pressure receiving plate includes a detection space sealing surface facing the surface of the detection portion installation member, in which when the liquid pressure is a predetermined value, the diaphragm expands until a volume of the liquid detection chamber becomes a predetermined level and separates the detection space sealing surface of the pressure receiving plate from the surface of the detection portion installation member against urging force of the urging member, in which the movable member brings the detection space sealing surface of the pressure receiving plate into contact with the surface of the detection portion installation member by the urging force of the urging member when the liquid pressure becomes lower than the predetermined value (for example, at the time of detecting ink-end or ink-near-end) and liquid is introduced into the liquid detection chamber for the first time (at the time of filling ink), and displaces the diaphragm to a position at which the volume of the liquid detection chamber becomes smaller than the predetermined volume, in which the movable member, at the time of filling ink, further includes a first liquid channel which guides the liquid from the liquid inlet to the detection space and a second liquid channel which guides the liquid from the detection space to the liquid outlet, and a part of the second liquid channel is open at a first sealing surface of the movable member, in which the liquid detection chamber, at the time of filling ink, includes a second sealing surface which seals a part of the second liquid channel by being brought into contact with the first sealing surface of the movable member, in which the liquid detection chamber includes an opening through which the surface of the detection portion installation member is exposed and an abutting surface of the detection portion installation member, and in which when a distance from the first sealing surface of the pressure receiving plate to the detection space sealing surface is defined as L1, and a distance from the second sealing surface of the liquid detection chamber to the abutting surface is defined as L2, a relationship of L1>L2 is satisfied.

According to one aspect of the invention, a portion (pressure receiving plate) of a movable member urged by an urging member is attached to a flexible diaphragm. If liquid pressure in a liquid detection chamber is high, the diaphragm is displaced and thus a volume of the liquid detection chamber is increased. Accordingly, such displacement makes the pressure receiving plate be separated from one surface of the detection portion installation member, resisting against the urging force of the urging member. If the liquid pressure becomes lower than a predetermined value, the movable member is displaced by the urging force of the urging member, so the pressure receiving plate comes into contact with the surface of the detection portion installation member and the diaphragm is displaced to a position at which the volume of the liquid detection chamber decreases. When the pressure receiving plate is separated from the detection portion installation member and the detection space is open in the detection chamber, attenuation of the remaining vibration waveform decreases. Conversely, when the pressure receiving plate abuts against the surface of the detection portion installation member and the detection space is closed, attenuation of the remaining vibration waveform increases. Thanks to this contradictory action, it is possible to perform liquid detection, such as remaining amount of liquid and pressure on the basis of the position of the movable member.

Here, the relationship L1>L2 means that the pressure receiving plate overlaps the detection portion installation member from the point of view of dimension. With the actual structure, since the detection portion installation member is supported by the flexible film, the flexible film is flexed by the overlapping amount with the pressure receiving plate, the detection space sealing surface of the pressure receiving plate surely comes into contact with the detection portion installation member. With such a structure, it is possible to prevent the event in which the pressure receiving plate does not come into contact with the detection portion installation member from occurring at the time of liquid detection (that is, when the remaining amount of liquid becomes a predetermined level or below and the liquid pressure is lower than a predetermined value).

In this aspect of the invention, it is preferable that L1 and L2 are designed to satisfy an expression $L0<L1<L0+L01$ when a design reference value of the distances L1 and L2 is L0 and a maximum value of positive errors of the distance L1 is L0, and L1 and L2 are designed to satisfy an expression $L0-L02<L2<L0$, and an expression $L02<L1-L2<L01$ is established when a maximum value of negative errors of the distance L2 is −L02 (here, $L02<L01$).

With such a structure, even if the dimension error occurs, the relationship $L1>L2$ is always established in the tolerance range (allowable error range).

In this aspect of the invention, it is preferable that an expression $L1-L2>|\Delta L1-\Delta L2|$ is established (here, $\Delta L1$ and $\Delta L2$ are positive and negative errors) when the dimension error of the distance L1 is defined as $\Delta L1$ and the dimension error of the distance L2 is defined as $\Delta L2$.

That is, if the difference (L1−L2) of the distances is always greater than the absolute value $|\Delta L1-\Delta L2|$ of the error difference, it means that the pressure receiving plate always overlaps the detection portion installation member from the point of view of the dimension. Further, the absolute value $|\Delta L1-\Delta L2|$ of the error difference becomes the maximum when the distance L1 is the minimum value (a negative maximum value) and the distance L2 is the maximum value (a positive maximum value).

In this aspect of the invention, it is preferable that the piezoelectric sensor detects a value of amplitude of the remaining vibration waveform on the basis of the distance between the piezoelectric sensor and the pressure receiving plate. Since measurement is performed by comparing the amplitude of the remaining vibration waveform with a threshold value a predetermined period after excitation rather than using attenuation time of the remaining vibration waveform or counting the number of waveforms, it is possible to measure the remaining amount or the pressure of the liquid in a simple manner with high precision.

In this aspect of the invention, the detection portion installation member can be provided with two through holes which communicate with the liquid detection chamber and the detection space, respectively. When the liquid is introduced into the liquid detection chamber for the first time, it is possible to charge the detection space with the liquid and discharge bubbles formed in the detection space by two through holes.

In this aspect of the invention, the movable member includes an upstream side member extending from the pressure receiving plate to the liquid inlet and a downstream side member extending from the pressure receiving plate to the liquid outlet. The first liquid channel is formed in the upstream side member and the pressure receiving plate and guides the liquid from the liquid inlet to the detection space via one of the through holes formed in the detection portion installation member. The second liquid channel is formed in the downstream side member and the pressure receiving plate and guides the liquid from the detection space to the liquid outlet via the other one of the through holes formed in the detection portion installation member. With this structure, it is possible to surely fill the detection space with the liquid when the liquid is introduced into the liquid detection chamber for the first time thanks to the capillary action or the inhalation action in the first and second liquid channels.

In this aspect of the invention, it is possible to acquire a sealing load which bring the first sealing surface and the second sealing surface come into contact with each other only by the use of the urging force of the urging member. Accordingly, it is not needed to externally apply a sealing load which brings the first sealing surface and the second sealing surface come into contact with each other when the liquid is introduced into the liquid detection chamber for the first time.

According to another aspect of the invention, there is provided a liquid container including a liquid containing portion which contains liquid therein and the liquid detection unit connected to the liquid containing portion and provided with a liquid inlet through which the liquid in the liquid containing portion is supplied.

According to further another aspect of the invention, there is provided a liquid detection unit including a casing having a liquid detection chamber, a sensor member having a cavity, a sensor base which is provided with a liquid supply hole and a liquid discharge hole communicating with the cavity and supports the sensor member, a first flexible member which supports the sensor base, attaches the sensor base to the casing so as to face the liquid detection chamber, and seals a first opening of the liquid detection chamber, an abutting portion (abutting surface) provided in the liquid detection chamber and positioning the sensor base by abutting against one surface of the sensor base, a movable member being movable in the liquid detection chamber, a second flexible member which supports the movable member and seals a second opening facing the first opening of the liquid detection chamber, an urging member which urges the movable member toward the sensor base, and a first liquid channel and a second liquid channel formed when a first sealing surface provided in the movable member and a second sealing surface provided in the liquid detection chamber of the casing abut against each other and a cavity sealing surface provided in the movable member and one surface of the sensor base abut against each other by the use of the urging force of the urging member, in which the first liquid channel communicates with the liquid supply hole and the second liquid channel communicates with the liquid discharge hole, and in which a distance between the first sealing surface of the movable member and the cavity sealing surface is larger than a distance between the second sealing surface of the casing and the abutting portion (abutting surface).

In this case, the casing includes a liquid introduction channel through which liquid is introduced into the liquid detection chamber, and a liquid discharge channel through which the liquid in the liquid detection chamber is discharged, in which the first liquid channel includes a first through hole provided outside the cavity sealing surface of the movable member, a second through hole provided on the cavity sealing surface, and a first communicating channel through which the first and second through holes communicate with each other, in which the second liquid channel includes a third through hole provided outside the cavity sealing surface of the movable member, a fourth through hole provided on the cavity sealing surface, and a second communicating channel through which the third and fourth through holes communicate with each other, and a third communicating channel which is formed by making the first sealing surface of the movable member abut against the second sealing surface of the casing and which communicates with the third through hole, in which the liquid supplied to the liquid detection chamber through the liquid introduction channel sequentially passes through the first through hole, the first communicating channel, and the second through hole, flowing from the liquid supply hole into the cavity, and in which the liquid discharged from the liquid discharge hole of the cavity sequentially passes through the fourth through hole, the second communicating channel, the third through hole, and the third communicating channel, flowing from the liquid detection chamber into the liquid discharge channel.

The urging member includes a cover having an abutting portion (protrusion) which faces the movable member with the second flexible member between them and being supported by the casing in a pivotable manner, and a spring member urging the cover toward the movable member.

The casing is equipped with a guide portion which guides movement of the movable member to the detection chamber.

The sensor member can detect the state in which a level of remaining liquid is a predetermined level or below by a value of amplitude of a remaining vibration waveform of vibrations applied to the cavity.

The liquid detection unit includes a liquid introduction member which is provided in a liquid supply channel used for supplying the liquid from a liquid containing portion which contains liquid therein to a liquid ejection device, which communicates with the liquid introduction channel, and which guides the liquid to be introduced from the liquid containing portion to the liquid detection unit, and a liquid discharge member which communicates with the liquid discharge guide channel and guides the liquid to be discharged from the liquid detection unit to the liquid ejection device.

BRIEF DESCRIPTION OF THE DRAWINGS

FIG. 14 is an enlarged view illustrating part B of FIG. 9.

FIG. 15 is a schematic sectional view for explaining an early-stage operation and an ink detection operation.

DESCRIPTION OF EXEMPLARY EMBODIMENTS

Hereinafter, embodiments which are concrete forms of the invention will be described with reference to the accompanying drawings.

Brief Overview of a Liquid Ejection Device

Figure 1:
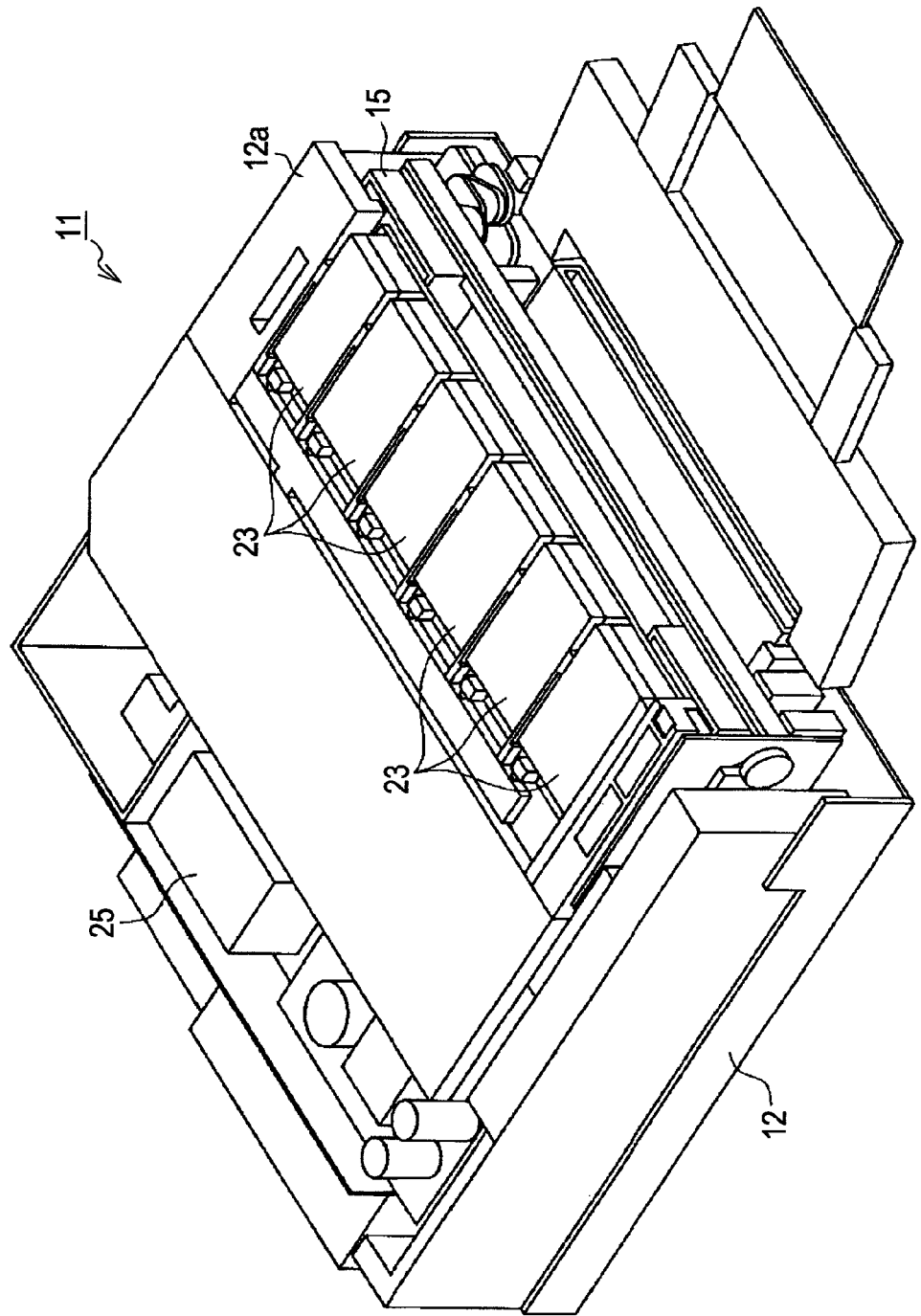
FIG. 1 is a perspective view illustrating a printer according to one embodiment of the invention.
Figure 2:
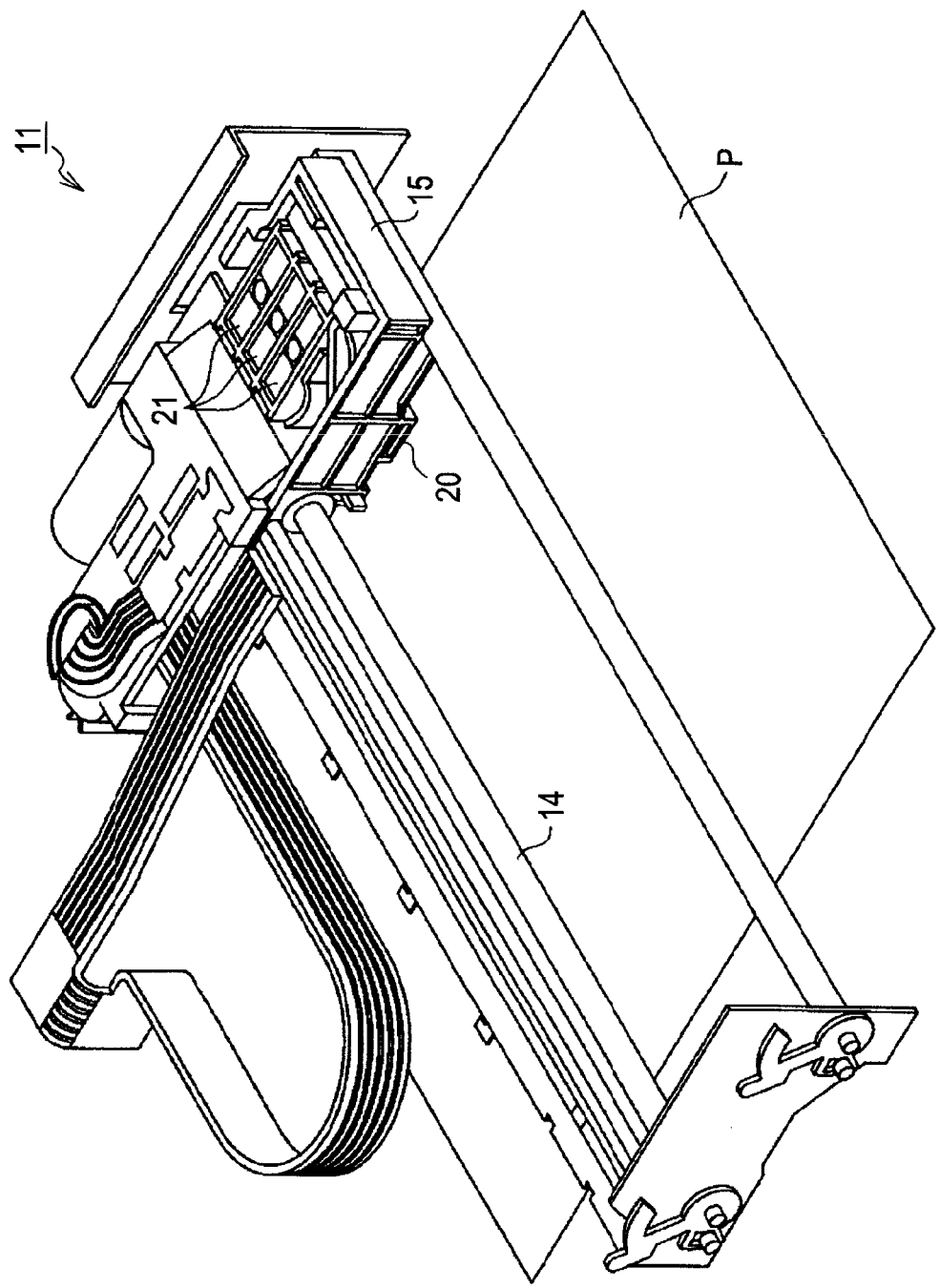
FIG. 2 is an exploded perspective view illustrating the printer shown in FIG. 1.

As shown in FIGS. 1 and 2, a printer (ink-jet-type recording device) 11 serving as the liquid ejection device according to one embodiment of the invention is covered with a frame 12. In the frame 12, a guide axis 14, a carriage 15, a recording head 20 serving as a liquid ejection head, a valve unit 21, an ink cartridge 23 serving as a liquid container, and a pressurizing pump 25 serving as a pressurized air supply means are provided.

The frame 12 is a box having a rectangular parallelpiped shape. The front surface of the frame 12 is provided with a cartridge holder (cartridge attachment portion) 12a.

The guide axis 14 has a bar shape. The guide axis 14 is provided in the frame 12. With this embodiment of the invention, a direction in which the guide axis 14 is provided is called a main scanning direction. The carriage 15 is engaged with the guide axis 14 in a manner such that the guide axis 14 penetrates through the carriage 15, so the carriage 15 can move in relative to the guide axis 14. The carriage 15 can reciprocate in the main scanning direction. The carriage 15 is connected to a carriage motor via a timing belt and the carriage motor is supported by the frame 12. As the carriage motor starts to drive, the carriage 15 is driven via the timing belt, and the carriage 15 reciprocates in the main scanning direction along with the guide axis 14. The recording head 20 provided on the lower surface of the carriage 15 is equipped with a plurality of nozzles in order to eject ink (water-based ink or oil-based ink), i.e. liquid. The recording head 20 performs recording of print data, such as images and characters, by ejecting ink droplets to a recording medium P, such as recording paper. The valve unit 21 is mounted on the carriage 15 and supplies, ink which is temporarily stored, to the recording head 20 in the state in which pressure is adjusted.

With this embodiment of the invention, three valve units 21 are provided. Each of the valve units 21 can separately supply two kinds of ink to the recording head 20 in the state in which pressure is adjusted. In this manner, the printer 11 of this embodiment can deal with six colors of ink (black, yellow, magenta, cyan, light magenta, and light cyan).

A platen is provided under the recording head 20. The platen supports recording medium P transported in a subscanning direction, which perpendicularly intersects the main scanning direction, by a transporting means.

Liquid Container

Figure 3:
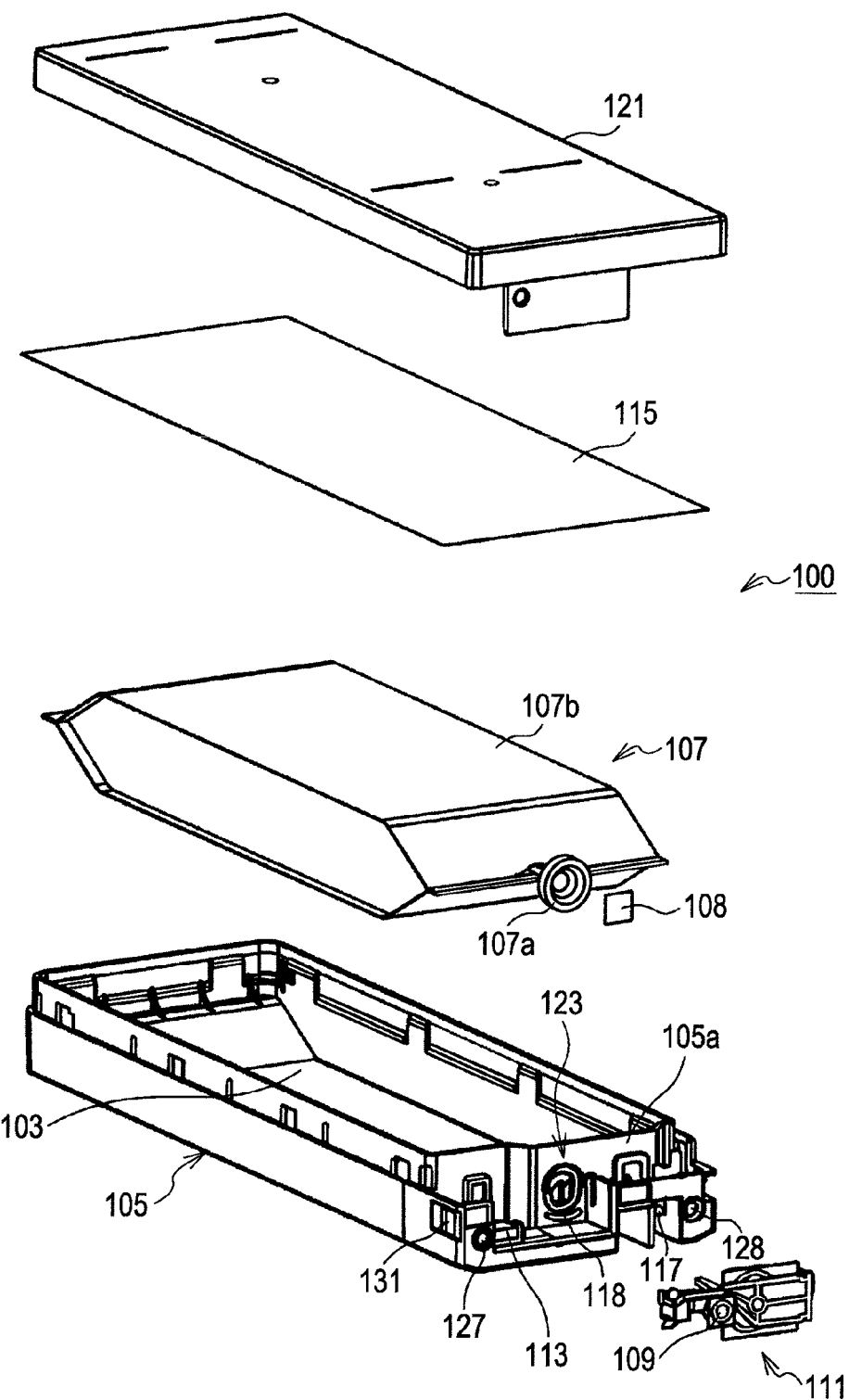
FIG. 3 is an exploded perspective view illustrating an ink cartridge shown in FIG. 1.

FIG. 3 is an exploded perspective view illustrating the ink cartridge which is an example of a liquid container according to one embodiment of the invention. The ink cartridge 100 is detachably attached to the cartridge holder 12a of the printer 11 and the ink contained in the ink cartridge 100 is supplied to the recording head 20.

The ink cartridge 100 includes a container main body 105 formed by dividing a bag receiving portion (ink pack receiving portion) 103 pressurized by pressurized air, an ink pack (liquid containing portion, liquid containing body) 107 received in the bag receiving portion 103 for discharging the stored ink from an ink discharge member 107a by the pressure applied by the bag receiving portion 103, and a liquid detection unit 111 having an ink discharge member 109 used to supply ink to the printer 11 (recording head 20) and detachably mounted in the container main body 105.

The container main body 105 is a chassis formed through a resin molding method. The container main body 105 is divided into the bag receiving portion 103 which is almost box-shaped and opens at an upper portion thereof, and a detection unit receiving portion 113 which is provided in front of the bag receiving portion 103 and receives the liquid detection unit 111.

The open portion of the bag receiving portion 103 is sealed by a sealing film 115 after the ink pack 107 is received in the bag receiving portion. For this reason, the bag receiving portion 103 becomes a sealed chamber. A resin-based cover 121 which covers the detection unit receiving portion 113 and the sealing film 115 is mounted on the container main body 105.

A barrier wall 105a which is a compartment between the bag receiving portion 103 and the detection unit receiving portion 113 is provided with a pressurizing hole 117 which is a communicating channel used to introduce pressurized air into the bag receiving portion 103. If the ink cartridge 100 is attached to the cartridge holder 12a of the printer 11, the pressurizing pump 25 is connected to the pressurizing hole 117 so as to communicate, and it is possible to put pressure on the ink pack 107 by the pressurized air supplied to the bag receiving portion 103 which is a sealed chamber.

The ink pack 107 is a structure in which an ink discharge member 107a having a tube shape, which is connected to a connection needle 111a (see FIG. 5B) of the liquid detection unit 111 in an insertion joint manner, is attached to one end of a flexible bag 107b which is made of a plurality of layers of sealing films. A leading end of the ink discharge member 107a protrudes into the detection unit receiving portion 113, penetrating through an opening 118 for penetration of the connecting hole, which formed in the barrier wall 105a in a sealed state. The ink pack 107 is filled with ink which has already been treated to remove bubbles before it is connected to the liquid detection unit 111, and then the open end of the ink discharge member 107a is sealed with the sealing film 108.

Respective end portions of the front wall of the container main body 105 are provided with poisoning holes 127 and 128 into which positioning pins provided in the cartridge holder 12a will be inserted when the ink cartridge 100 is attached to the cartridge holder 12a of the printer 11.

The side wall of the container main body 105 which is close to the positioning holes 127 is provided with a circuit board 131. On the front surface of the circuit board 131, a plurality of contact points which makes electrical connection with contact terminals provided in the cartridge holder 12a when the ink cartridge 100 is attached to the cartridge holder 12a of the printer 11. A memory element is also mounted on the back surface of the circuit board 131 in order to store information such as ink remaining amount. The back surface of the circuit board 131 is further provided with contact points to be connected to the sensor member 132 which is mounted in the liquid detection unit 111 and detects the liquid remaining state. Accordingly, when the ink cartridge 100 is mounted in the printer 11, the memory element and the sensor member 132 are electrically connected to a control circuit of the printer 11 via the circuit board 131, and thus it becomes possible to control the memory element and the sensor member 132 from the printer 11.

Liquid Detection Unit

Figure 4:
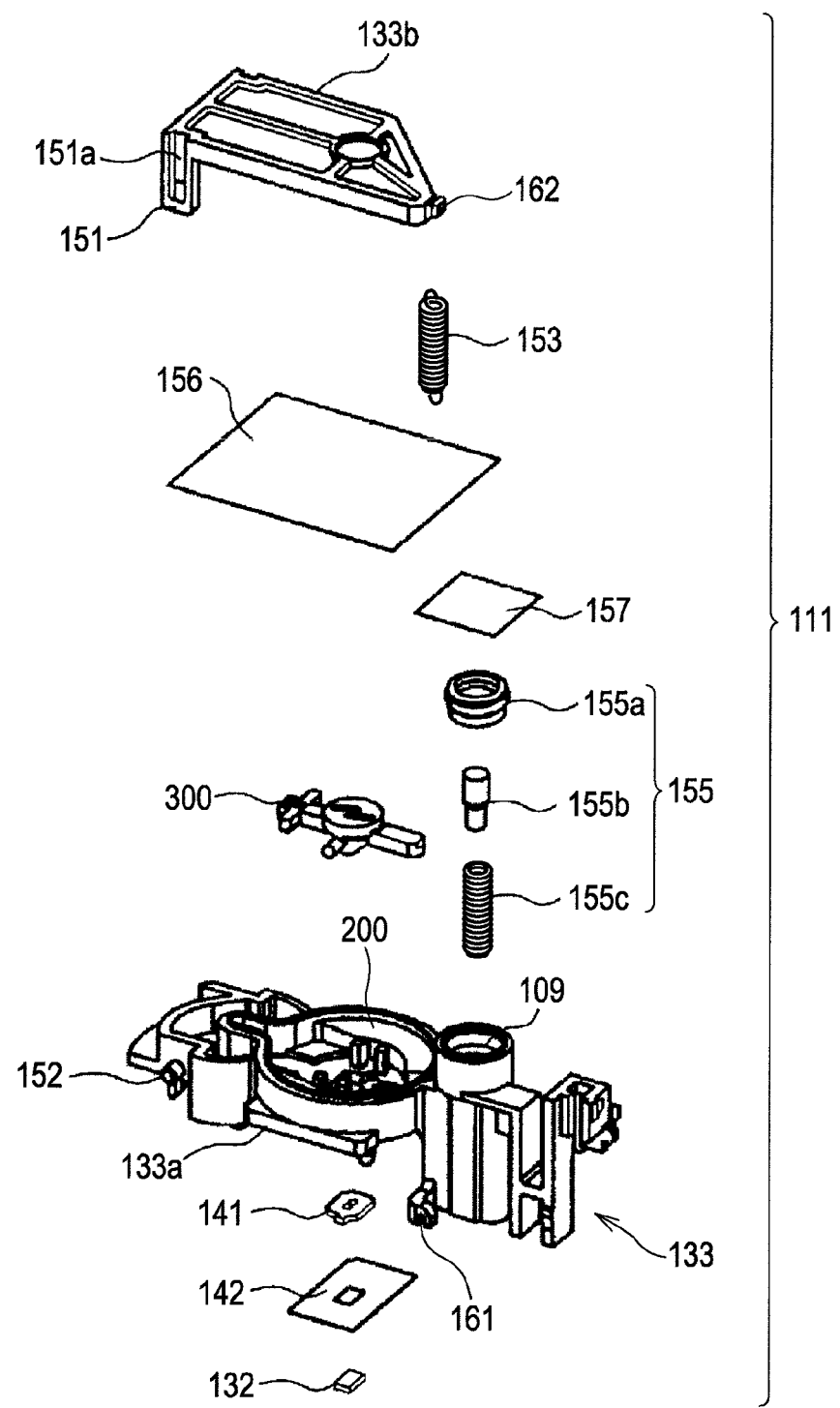
FIG. 4 is an exploded perspective view illustrating a liquid detection unit.
Figure 5:
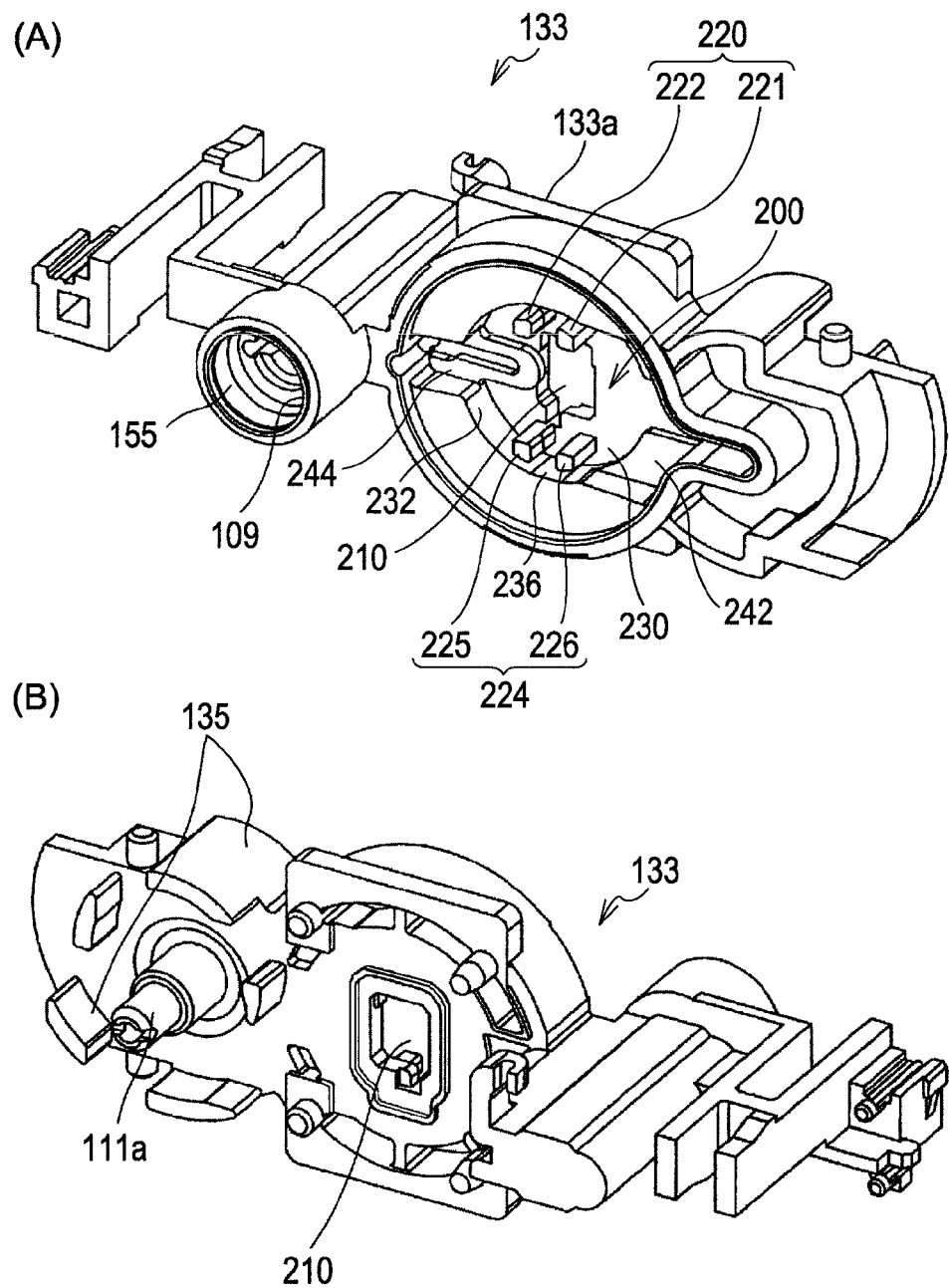
FIG. 5A is a schematic perspective view illustrating a casing main body of the liquid detection unit.
FIG. 5B is a schematic perspective view illustrating a casing main body of the liquid detection unit.

The liquid detection unit 111 according to this embodiment of the invention, as shown in FIGS. 4, 5A, and 5B, includes a unit casing 133 which is made of resin and is to be attached to the container body 105 by rotational manipulation, the sensor member (detection portion) 132 fixed to the back side of the unit casing 133 via a sensor base (detection portion installation member) 141, and an insulating sensor sealing film (flexible film) 142 which covers the surface of the sensor base 141 provided around the sensor member 132.

The unit casing 133 includes an ink discharge member 109 in which an ink supply needle provided in the cartridge holder 12a is inserted and a casing main body 133a having an ink detection chamber (liquid detection chamber) 200 communicating with the ink discharge member 109. In the ink detection chamber 200, a movable member 300 shown in FIG. 4 is provided in a displaceable manner. Further, a sealing film (hereinafter, also called diaphragm) 156 which demarcates a pressure chamber used for detection of the ink remaining amount by sealing the opening of the ink detection chamber 200 is provided. Still further, a lid body 133b which covers and protects almost the entire sealing film 156 is provided.

The lid body 133b is structured in a manner such that an engaging axis 152 protruding from the outer circumference of the casing main body 133a fits in a hole 151a of an engaging piece 151 protruding from the base. Accordingly, it is combined with the case main body 133a in a freely pivotable manner. Further, the lid is fixed to the casing main body 133a in a manner such that a leading end of the lid body is connected to the casing main body 133a by a spring (urging member) 153. The spring 153 is an extension coil spring, in which one end is interlocked with an interlocking portion 161 provided in the casing main body 133a and the other end is interlocked with an interlocking portion 162 provided in the lid body 133b. The spring 153 urges the lid body 133b toward a position (barrier wall 105a side) at which the sensor member 132 is positioned.

The ink discharge member 109 is provided with a channel opening and closing mechanism 155 which opens a channel when the ink supply needle is inserted. The channel opening and closing mechanism 155 includes a sealing member 155a having a cylindrical shape and fixed to the ink discharge member 109, a valve body 155b which maintains the closed state of the channel by sitting on the sealing member 155a, and a spring member 155c which urges the valve body 155b the sealing member 155a in the seating direction.

The open end of the ink discharge member 109 mounted in the channel opening and closing mechanism 155 is sealed by the sealing film 157. The sealing film 157 is adhered to the open end surface of the ink discharge member 109 and the end surface of the sealing member 155a mounted in the ink discharge member 109.

When the ink cartridge 100 is mounted in the printer 11, the ink supply needle breaks and penetrates the sealing film 157 and is then inserted into the ink discharge member 109. At this time, as the ink supply needle separates the valve body 155b from the sealing member 155a, the channel in the unit casing 133 comes to be able to communicate with the ink supply needle, and thus the ink supply to the printer 11 can be started.

As shown in FIG. 5B, the casing body 133a has a container interlocking portion 135 which is to be interlocked with the attaching portion 123 in a pivotable manner at the back side thereof, and particularly at a position corresponding to the attaching portion 123 (see FIG. 3) of the container body 105. Further, a connection needle 111a to be inserted into the ink discharge member 107a of the ink pack 107 is provided at the inner side of the container interlocking portion 135. The connection needle 111a penetrates and breaks the sealing film 108 (see FIG. 3) adhered to the ink discharge member 107a, and is then inserted into the ink discharge member 107a. In this manner, the valve mechanism of the ink discharge member 107a is opened and thus ink can be discharged.

The sensor member 132 is a piezoelectric detection means fixed to the back side of the casing main body 133a so as to apply vibrations to the sensor cavity (detection space) 132A which will be described with reference to FIGS. 7 and 15, and outputs the change of the remaining vibrations depending on the change of the ink remaining amount (pressure) as an electrical signal. An output signal of the sensor member 132 is analyzed by the control circuit in the printer 11 and thus the ink remaining amount in the ink pack 107 is detected.

Detection Portion

Figure 6:
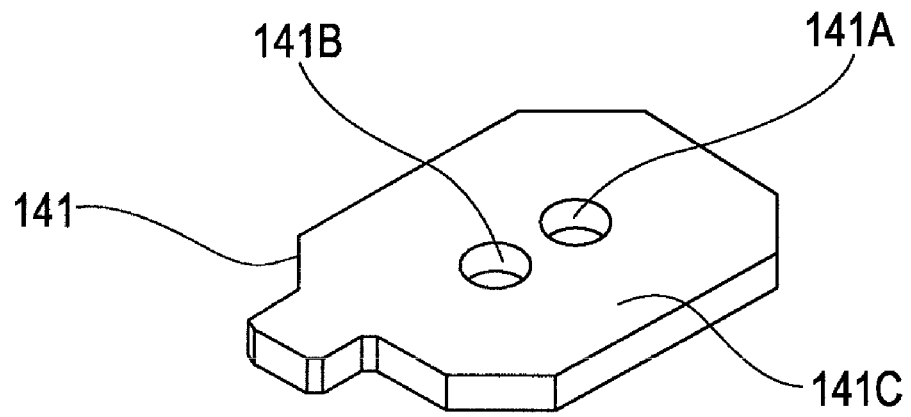
FIG. 6 is a perspective view illustrating a sensor base, in which the sensor base is viewed from the back side.

FIG. 6 is a perspective view illustrating the sensor base 141, which is viewed from the under side. The sensor base 141 is provided with a first through hole (supply channel) 141A which penetrates the sensor base in a thickness direction and a second through hole (discharge channel) 141B. The sensor base 141 functions as a vibrating plate and is made of, for example, stainless steel (SUS).

Figure 7:
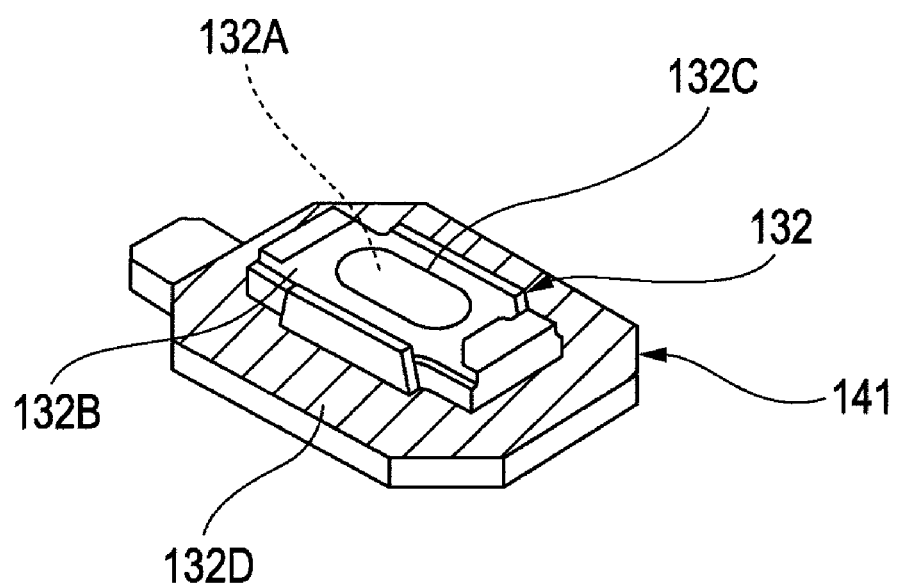
FIG. 7 is a perspective view illustrating the sensor base, in which the sensor base is viewed from the front side.

FIG. 7 is a perspective view illustrating the sensor base 141 mounted in the sensor member 132, which is viewed from the upper side. The sensor member 132 has a sensor cavity 132A (provided under the vibrating plate 132B in FIG. 7) which receives ink which is a detection object. The sensor cavity 132A is configured to communicate with the first through hole 141A and the second through hole 141B. The upper surface of the sensor cavity 132A is closed by the vibrating plate 132B. Furthermore, a piezoelectric element (piezoelectric sensor) 132C is arranged on the upper surface of the vibrating plate 132B.

The piezoelectric element 132C performs functions of applying vibrations to the sensor cavity 132A, detecting the remaining vibration waveform occurring along with the applied vibrations, and, for example, determining ink end or ink near-end (whether the remaining amount of ink contained in the ink pack 107 is a predetermined amount or below). A piezoelectric layer may be made of zirconate titanate (PZT), lead lanthanum zirconate titanate (PLZT), or lead-less piezoelectric film which does not contain lead.

The sensor member 132 is provided in a manner such that the lower surface thereof is placed at the center portion of the upper surface of the sensor base 141, and is integrated with the sensor base 141 into a single body by an adhesive layer 132D. Further, a gap between the sensor base 141 and the sensor member 132 is sealed with the adhesive layer 132D.

Detection Chamber and Movable Member

Figure 8:
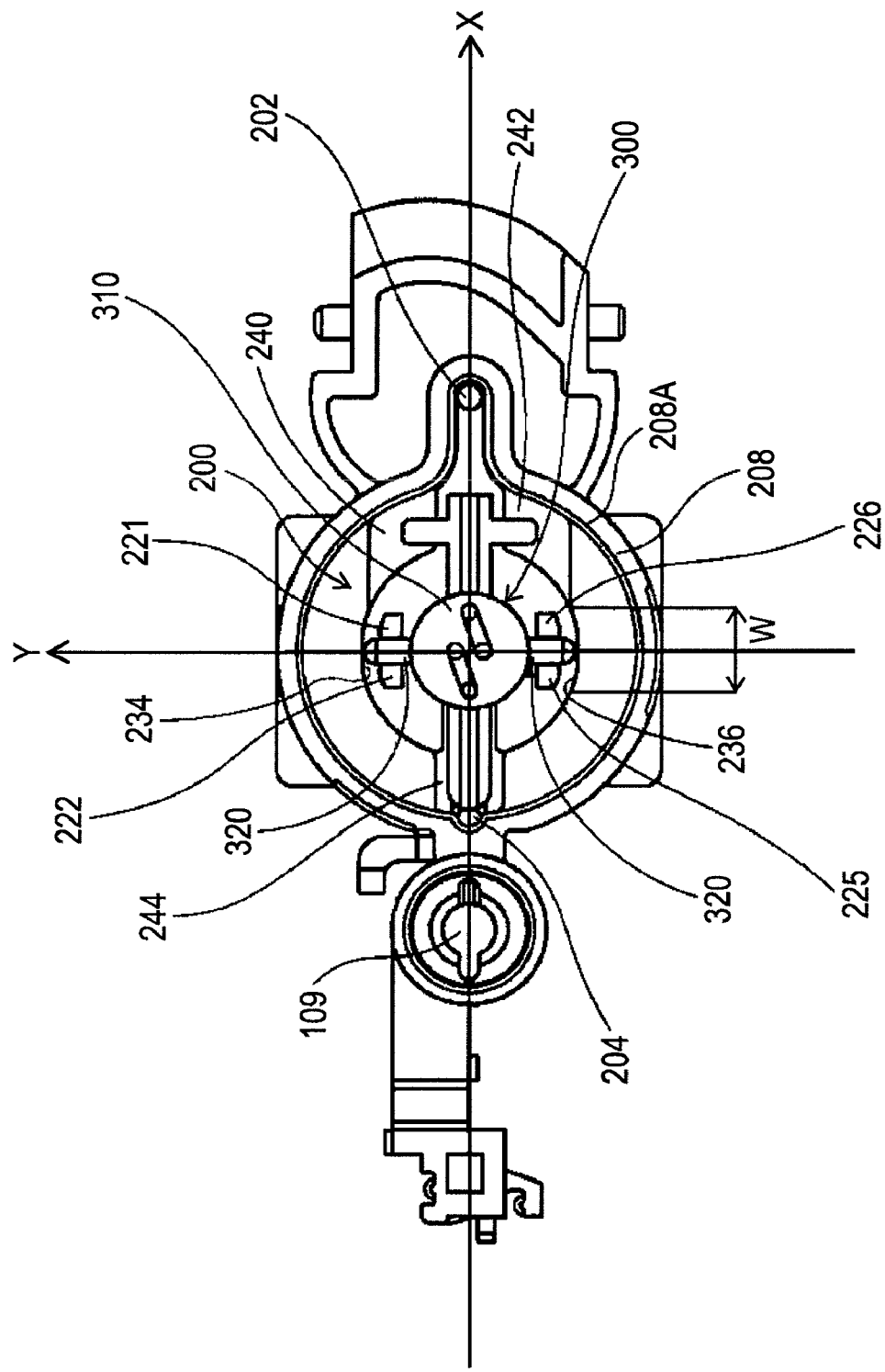
FIG. 8 is a plan view illustrating an ink detection chamber.
Figure 9:
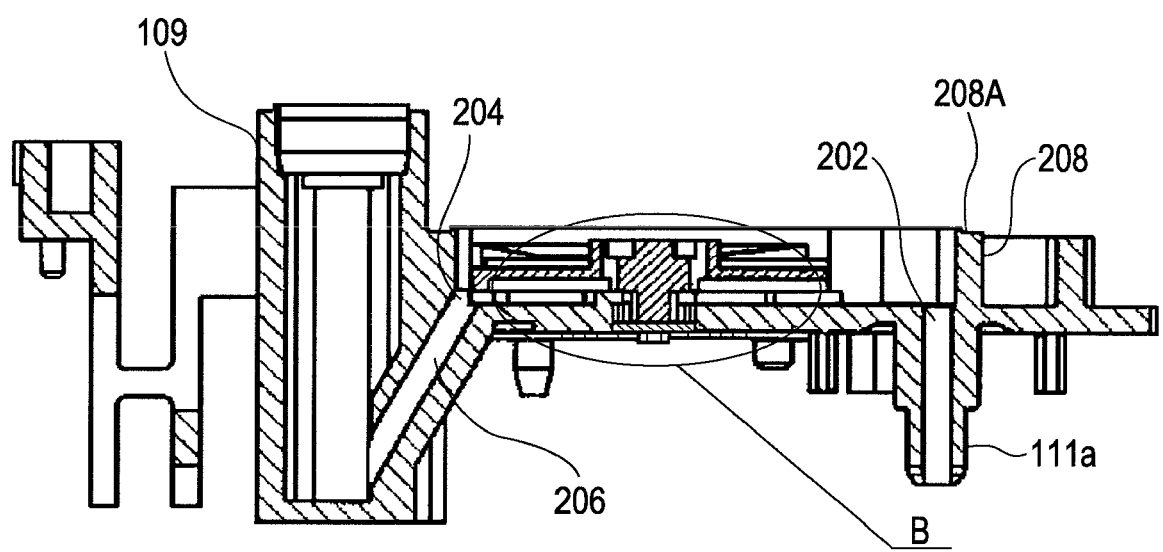
FIG. 9 is a sectional view taken along a Y-axis of FIG. 8.
Figure 10:
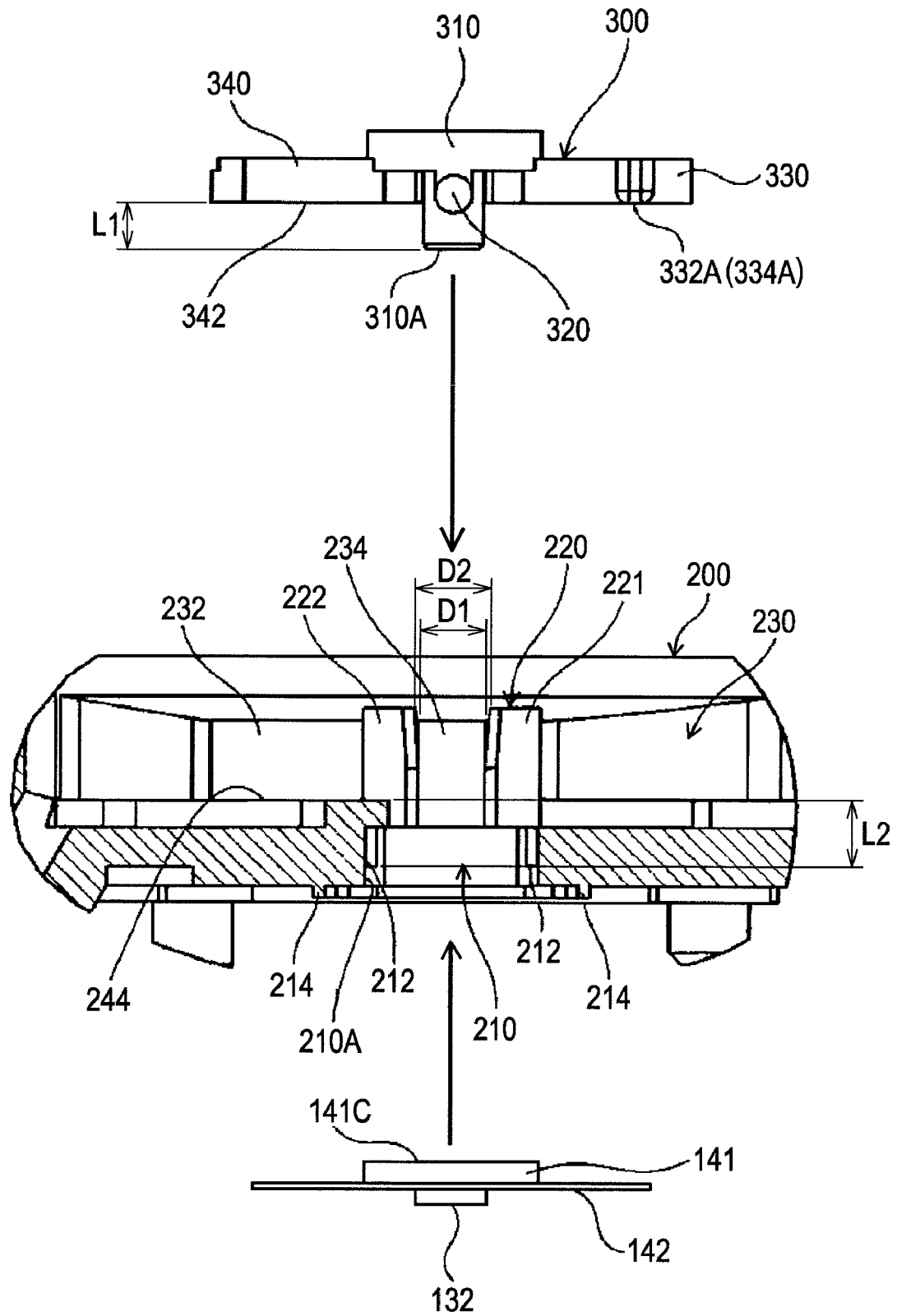
FIG. 10 is a schematic explanatory view for explaining attachment of a movable member, a sensor base, and a sensor member to an ink detection chamber.

FIG. 8 is a plan view illustrating the state in which the movable member 300 is arranged in the ink detection chamber 200. FIG. 9 is a sectional view taken along a direction of an X-axis of FIG. 8. FIG. 10 shows the sensor member 132 and the movable member 300 arranged in the ink detection chamber 200.

The ink detection chamber 200 is provided with an ink inlet (liquid inlet) 202 and an ink outlet (liquid outlet) 204. As shown in FIG. 9, the ink inlet 202 communicates with the connection needle 111a and the ink outlet 204 communicates with the ink discharge member 109 via an inclined channel 206.

An end surface of a surrounding wall 208 which demarcates the ink detection chamber 200 is provided with an adhesion rib 208A and a flexible diaphragm 156 (see FIG. 4) is adhered to the adhesion rib 208A. The ink detection chamber 200 closed by the diaphragm 156 forms a pressure chamber and thus the diaphragm 156 is displaced according to ink pressure between the ink inlet 202 and the ink outlet 204.

At the center position of the ink detection chamber 200, as shown in FIG. 10, an opening 210 is formed. The sensor base 141, which fixes the sensor member 132, and the movable member 300 are arranged to face the opening 210.

Figure 11:
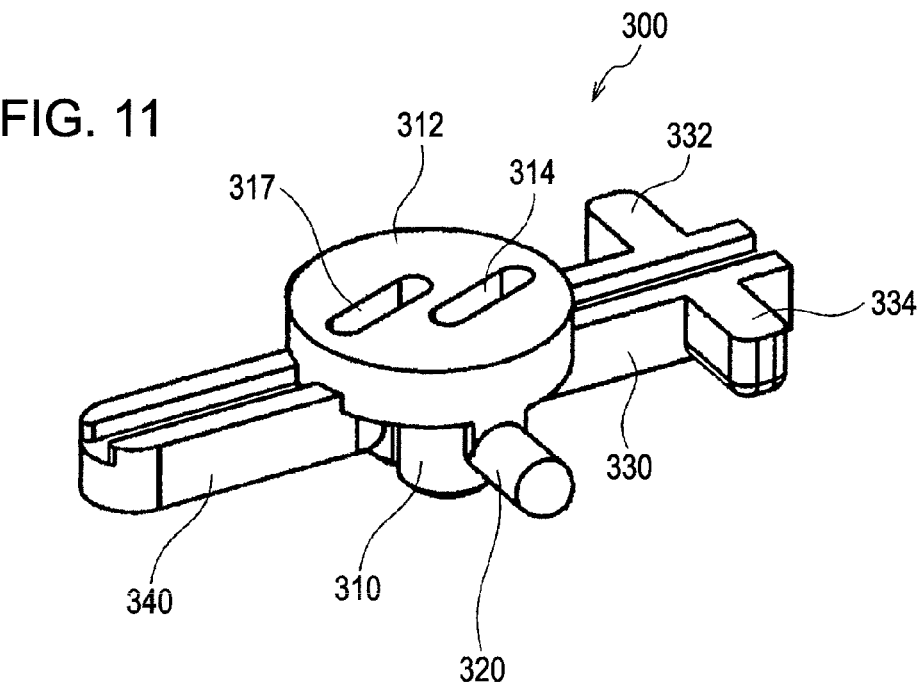
FIG. 11 is a schematic perspective view illustrating the movable member.
Figure 12:
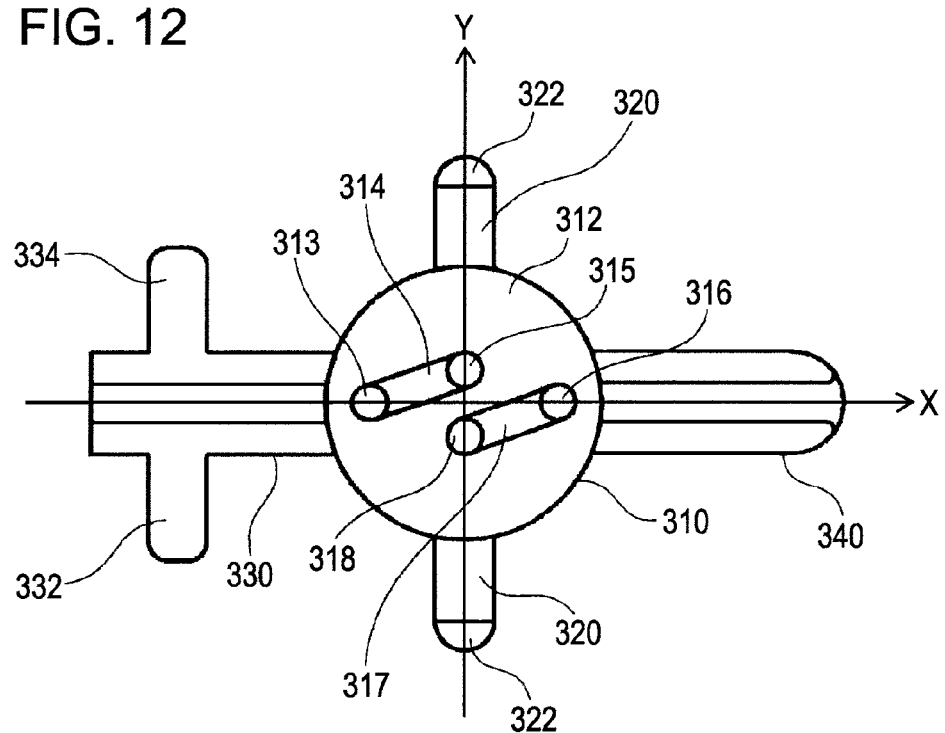
FIG. 12 is a plan view illustrating the movable member.
Figure 13:
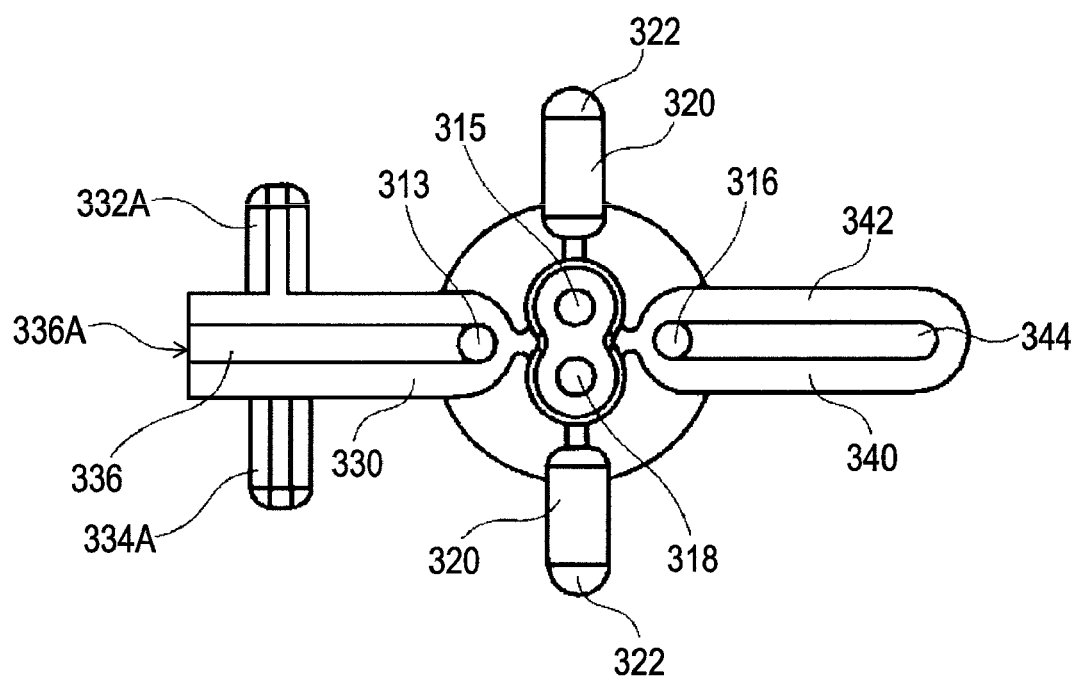
FIG. 13 is a rear view illustrating the movable member.

FIGS. 11 to 13 are a perspective view, a plan view, and a rear view illustrating the movable member 300, respectively. The movable member 300 includes a pressure receiving plate 310 and the diaphragm 156 is adhered to the upper end surface 312 of the pressure receiving plate 310. The lid body 133b is provided with a protrusion (abutting portion) provided so as to face the upper end surface 312. The protrusion put pressure on the pressure receiving plate 310 (movable member 300) by pressing the upper surface of the diaphragm 156 by urging force of the spring 153. In this manner, the movable member 300 is urged toward the sensor member 132 by the lid body 133b and the spring 153, and a lower end surface 310A of the pressure receiving plate 310 can come into contact with the one surface 141C of the sensor base 141. In the description below, the lower end surface 310A of the pressure receiving plate 310 which faces one surface 141C of the sensor base 141 is called a sensor cavity sealing surface (detection space sealing surface).

Here, an X-axis (first direction) and an Y-axis (second direction) are defined as directions in which two axes, which intersect at the center of the ink detection chamber 200 (the center of the pressure receiving plate 310 having a circular shape) each other, extends, respectively.

Two axes 320 which extend in the Y direction from the pressure receiving plate 310 are provided in the movable member 300. A leading end 322 of each axis 320 has a curved shape, i.e. hemispherical shape. Further, an upstream side member 330 and a downstream side member 340 which extend in X direction from the pressure receiving plate 310 are provided.

The upstream side member 330 has protrusion members 332 and 334 which protrudes in the Y direction. The back surfaces 332A and 334A of the protrusion members 332 and 334 are a reference surface 332A having a first height and a reference surface 334A having a second height, respectively.

The upstream side member 330 has a first trenched channel 336 extending in the X direction and communicating with the end opening 336A of the X direction at the back surface thereof (see FIG. 13). An inner end portion (downstream side end portion) of the first trenched channel 336 communicates with the first through hole 313 formed in the pressure receiving plate 310. The upper end surface 312 of the pressure receiving plate 310 is provided with a second trenched channel (first communicating channel) 314. The first through hole 313 and the second through hole 315 are formed so as to face respective end portions of the second trenched channel 314 and to penetrate the pressure receiving plate 310 (see FIG. 12). The second trenched channel 314 alternately extends in the X direction and Y direction and communicates with the first through hole 313 existing on the X-axis and with the second through hole 315 existing on the Y-axis.

The back surface 342 of the downstream side member 340 is a reference surface having a third height and functions as a first sealing surface.

The downstream side member 340 has a third trenched channel (third communicating channel) 344 formed at the back surface 342 thereof. An inner end portion (upstream side end portion) of the third trenched channel 344 communicates with the third through hole 316 formed in the pressure receiving plate 310. An upper end surface 312 of the pressure receiving plate 310 is provided with a fourth trenched channel (second communicating channel) 317. The third through hole 316 and the fourth through hole 318 are formed so as to penetrate the pressure receiving plate 310 at respective end portions, facing the fourth trenched channel 317. The fourth trenched channel 317 alternately extends in the X direction and Y direction, and communicates with the third through hole 316 existing on the X-axis and with the fourth through hole 318 existing on the Y-axis.

Here, since the diaphragm 156 is adhered to the upper end surface 312 of the pressure receiving plate 310, the second trenched channel 314 and the fourth trenched channel 317 are sealed by the diaphragm 156. As shown in FIG. 11 and FIG. 12, trenches are formed on the upper end surfaces of the upstream side member 330 and the downstream side member 340, but these trenches are provided in order to prevent shrinkage at the time of injection molding.

The first trenched channel 366, and second trenched channel 314, the first through hole 313, second through hole 315 formed in the upstream side member 330 and the pressure receiving plate 310 are called integrally a first channel. Similarly, the third trenched channel 344, the fourth trenched channel 317, the third through hole 316, and the fourth through hole 318 formed in the downstream side member 340 and the pressure receiving plate 310 are integrally called a second channel. The first channel is linked with the sensor cavity 132A as the second through hole 315 is linked with the first through hole (supply channel) 141A formed in the sensor base 141 shown in FIG. 6, and the second channel is linked with the sensor cavity 132A as the fourth through hole 318 is lined with the second through hole (discharge channel) 141B formed in the sensor base 141 shown in FIG. 6.

At the time when the ink is introduced into the ink detection chamber 200 for the first time (hereinafter, referred to as ink filling stage, or initial stage), the first channel and the second channel are established, and ink flows through the first channel, the first through hole 141A, the sensor cavity 132A (see FIG. 7), the second through hole 141B, and the second channel by the capillary effect, and the sensor cavity 132A is fully filled with ink. For such a reason, the movable member 300 can be called a channel forming member.

Positioning a Movable Member

A mechanism for positioning the movable member 300 will be described with reference to FIG. 8. In FIG. 8, a crossing point of two axes, which perpendicularly intersect each other, in directions of X-axis and Y-axis is at the center position of the ink detection chamber 200. The ink detection chamber 200 is provided with a first bearing (guide portion) 220 and a second bearing (guide portion) 224 (see FIG. 5A) for positioning two axes 320 of the pressure receiving plate 310. The first bearing 220 has two upstanding members 221 and 222 which stands up from the ink detection chamber 200 at respective sides (in X direction) of one axis 320 of the axes. The second bearing 224 has two upstanding members 225 and 226 which stands up from the ink detection chamber 200 at respective sides (in X direction) of the other one axis 320 of the axes.

As shown in FIG. 10, a distance between two upstanding members 221 and 222 of the first bearding 220 is set such that a distance D1 at a base side is smaller than a distance D2 at a free end side (D1<D2). The second bearing 224 has the same dimension as the first bearing 220.

A diameter of the axis 320 of the pressure receiving plate 310 is slightly smaller than the dimension D1. Accordingly, as shown in FIG. 8, a position of the movable member 300 in the X direction is determined by two axes 320 of the pressure receiving plate 310 and the first bearing 220 and the second bearing 224 which receive them, respectively.

On the other hand, in order to determine a position of the movable member 300 in the Y direction, counter members 234 and 236 which face the leading ends 322 of two axes 320 of the pressure receiving plate 310 are provided in the ink detection chamber 200. As shown in FIG. 5A, the ink detection chamber 200 has a concave portion 230 which receives the movable member 300 therein. The counter members 234 and 236 are formed at a portion of the inside wall surface 232 which forms the concave portion.

The inside wall surface 232 is a surrounding surface, but the counter members 234 and 236 formed at a portion thereof are formed as flat planes having a predetermined width W in the X direction of FIG. 8 (see FIG. 5A).

Since the counter members 234 and 236 are flat planes which are parallel to each other, a distance between two counter members 234 and 236 is constant. Here, if there is a dimension difference between the minimum distance D1 between the first bearing 220 and the second bearing 224 and the diameter of the axis 320, the movable member 300 is displaced in the X direction. However, if the difference is in a range of the width W, the position error in the Y direction is within a predetermined range.

Further, leading ends 322 of two axes 320 are hemispherical surfaces and are in contact with the counter members 234 and 236 in a point-contact manner. Accordingly, although the movable member 300 is displaced while the leading ends 322 of two axes 320 are in contact with the counter members 234 and 236, frictional resistance is very small. For this reason, displacement of the movable member 300 in the ink detection chamber 200 according the change of ink pressure is not obstructed.

As described above, the center of the movable member 300 is positioned to be on the crossing point of two axes (X, Y) which perpendicularly intersect each other, in which the crossing point is also the center of the ink detection chamber 200. Accordingly, precision of the positioning of the movable member 300 with respect to the ink detection chamber 200 is raised.

Next, positioning of the movable member 300 in a height direction will be described. As described above, the upstream side member 330 of the movable member 300 has the protrusion members 332 and 334, and the back surfaces 332A and 334A of the protrusion members 332 and 334 serve as a first height reference surface 332A and a second height reference surface 334A, respectively. The back surface 342 of the downstream side member 340 of the movable member 300 serves as a third height reference surface.

On the other hand, as shown in FIGS. 5A, 5B, and 8, the ink detection chamber 200 has the first height reference surface 240, the second height reference surface 242, and the third height reference surface 244 which are in contact with the first height reference surface 332A, the second height reference surface 334A, and the third height reference surface 342, respectively. The three reference surfaces including the first height reference surface 332A, the second height reference surface 334A, and the third height reference surface 342 provided on the movable member 300 abut against three reference surfaces including the first height reference surface 240, the second height reference surface 242, and the third height reference surface 244 provided in the ink detection chamber 200, respectively. The movable member 300 is in contact with the ink detection chambers 200 at three places (three planes). Accordingly, it is possible to stably set the position of the movable member in height.

With this embodiment of the invention, the first height reference surfaces, the second height reference surfaces, and the third height reference surfaces of the movable member 300 and the detection chamber 200 have the same height (that is, these surfaces are on the same imaginary plane). However, the heights of the first height reference surface and the second height reference surface, and the height of the third height reference surface may be different. Alternatively, the first height reference surface, the second height reference surface, and the third height reference surface may have different heights, respectively.

The back surface 342 of the downstream side member 340 of the movable member 300 comes into contact with the third height reference surface 244 of the ink detection chamber 200 when the ink is introduced into the ink detection chamber 200 for the first time (at the initial stage). The back surface 342 functions as the first sealing surface, and the third height reference surface 244 functions as the second sealing surface. With this structure, the third trenched channel 344 of the downstream side member 340 of the movable member 300 is sealed. In the sealing of the third trenched channel 344 of the downstream side member 340, it is very important to fill the sensor cavity 132A with ink by capillary effect at the initial stage. The reason is that the ink flows out along channels other than the first channel and the second channel of the movable member 300 since capillary effect is hardly achieved when sealing characteristics of the first sealing surface 342 and the second sealing surface 244 are not good. At the initial stage, at the time when the introduced ink exits the channel, the movable member 300 as well as the diaphragm 156 is displaced. Accordingly, the first sealing surface 342 and the second sealing surface 244 fall to the state in which they are not in contact with each other. That is, the first sealing surface 342 and the second sealing surface 244 are not in contact with each other any more at the initial stage. As a result, the sensor cavity 132A cannot be filled with ink, and therefore the ink remaining amount cannot be detected.

Accordingly, increasing positioning precision of the movable member 300 with respect to the ink detection chamber 200 is very important to fill the sensor cavity 132A with ink when the ink is introduced into the ink detection chamber 200 for the first time. According to the embodiment of the invention, it is possible to achieve such object.

The first sealing surface 342 and the second sealing surface 244 can be called a bubble removing sealing surface. That is, when the first sealing surface 342 and the second sealing surface 244 are surely sealed, it becomes easy to remove bubbles remaining in the sensor cavity 132A which is a detection space by the capillary effect or the inhalation effect.

At the time of detection of ink end or ink near-end, or at the initial stage, a sealing load which makes the first sealing surface 342 and the second sealing surface 244 be brought into contact with each other can be acquired by urging force of the spring 153 shown in FIG. 4. For such a reason, there is no need to additionally apply external force other than the urging force of the spring 153 at the initial stage.

Positioning a Sensor Base and a Detection Portion

Next, a method of positioning the sensor base 141 shown in FIG. 7 and the sensor member 132 mounted in the sensor base will be described.

As described above, the ink detection chamber 200 has an opening 210 through which one surface of the sensor base 141 is exposed. In the opening 210, three abutting surfaces 212 which abut against the surfaces of the sensor base 141 are provided (but, there are only two abutting portions in FIG. 10). By the way that one surface of the sensor base 141 abuts against the abutting surface 212, the attachment height of the sensor base 141 and the sensor member 132 is determined.

The opening 210 of the ink detection chamber 200 has an inner peripheral wall 210A having a profile shape corresponding to an outline of the sensor base 141. An adhesion platform 214 to which the sensor sealing film 142 is to be adhered is formed around the opening 210.

A position of the sensor base 141 inserted into the opening 210 in the height is determined in a manner such that the sensor base 141 abuts against the abutting surface 212, and the position of the sensor base in a two-dimensional plane is determined by the inner peripheral wall 210A. Since a crossing point, two-dimensional coordinate (X, Y), is set at the center of the opening 210, the center of the sensor member 132 mounted in the sensor base 141 is set at the crossing point of the two-dimensional coordinate (X, Y).

Here, as shown in FIG. 10, a designed value of the distance from the first sealing surface 342 to the sensor cavity sealing surface 310A in the pressure receiving plate 310 is assumed as L1, and a designed value of the distance from the second sealing surface 244 to the abutting surface 212 of the ink detection chamber 200 is assumed as L2. For this instance, L1 and L2 satisfy Expression 1:

$$L1 > L2 \tag{1}$$

FIG. 14 is an enlarged view showing a part B of FIG. 9. Expression 1 means that the sensor cavity sealing surface 310A of the pressure receiving plate 310 provided at a lower position than one surface (sealing surface) 141C of the sensor base 141 in an overlapping manner (that is, the sensor cavity sealing surface is provided underneath the sealing surface of the sensor base). In actual practice, as shown in FIG. 14, the pressure receiving plate 310 does not overlap with the sensor base 141, only the overlapped portion of the sensor base 141 is flexed down due to the flexibility of the sensor sealing film 142, and the sensor cavity sealing surface 310A of the pressure receiving plate 310 surely comes into contact with the surface (sealing surface) 141C of the sensor base 141. For such a reason, it is possible to lower a value of amplitude of the remaining vibration waveform below a predetermine value at the time of detection of ink remaining amount.

The distances L1 and L2 will be described below in detail. When a designed reference value of the distances L1 and L2 is L0 and the maximum of positive variations of the distance L1 is L01, the distance L1 is designed to satisfy an expression L0<L1<L0+L01. When the maximum of negative errors of the distance L2 is −L02, the distance L2 is designed to satisfy an expression L0−L02<L2<L0, but L02<L01.

In such a case, the following expression, Expression 2, will be established.

$$L02 < L1 - L2 < L01 \tag{2}$$

If Expression 2 is established, Expression 1 must be also established. That is, a difference between the distance L1 and L2 may be a value between the absolute value L2 of the maximum value of the negative variations of the distance L2 and the maximum value of the position variations of the distance L1.

The distances L1 and L2 which satisfy Expression 1 can be defined as follows. When a dimension error of the distance L1 is ΔL1 and a dimension error of the distance L2 is ΔL2 (here, ΔL1 and ΔL2 are positive and negative errors), it is preferable that an expression L1−L2>|ΔL1−ΔL2| is established.

That is, if the distance difference (L1−L2) is always greater than the absolute value |ΔL1−ΔL2| of the error difference, it means that the pressure receiving plate 310 always overlaps the sensor base 141 from the point of view of dimension. Further, when the absolute value |ΔL1−ΔL2| of the error difference is maximum, the distance L1 becomes minimum (i.e. negative maximum error) and the distance L2 becomes maximum (i.e. positive maximum error).

Operation at the Time of Liquid Detection and at the Initial Stage

When ink is introduced into the ink detection chamber 200 for the first time, the sensor cavity sealing surface 310A of the pressure receiving plate 310 comes into contact with the surface 141C of the sensor base 141 by the urging force of the spring 153, the diaphragm 156 is displaced to a position at which the ink detection chamber 200 decreases in volume. This state is shown in FIG. 15. If ink begins to flow into the ink detection chamber 200, as shown in FIG. 15, the flow of ink is formed in the first channel and the second channel, and the sensor cavity 132A comes to be filled with ink. If bubbles are formed in the sensor cavity 132A, the bubbles are discharged through the second channel which is a downstream side channel.

On the other hand, before finishing detection of ink end or ink near-end, ink pressure in the ink detection chamber 200 is high. Accordingly, unlike the state shown in FIG. 15, the diaphragm 156 expands, the volume of the ink detection chamber 200 increases, and the pressure receiving plate 310 is separated from the surface 141C of the sensor base 141, resisting against the urging force of the spring 153. If the ink pressure is lower than a predetermined value, the movable member 300 is displaced to a position at which the sensor cavity sealing surface 310A of the pressure receiving plate 310 comes into contact with the surface 141C of the sensor base 141 by the urging force of the spring 153 and the diaphragm 156 is displaced to a position at which the volume of the ink detection chamber 200 decreases, falling to the state shown in FIG. 15. When the pressure receiving plate 310 is separated from the sensor base 141 and the sensor cavity 132A is open to communicate with the ink detection chamber 200, attenuation of the remaining vibration waveform is weakened. On the other hand, when the pressure receiving plate 310 is in contact with the sensor base 141 and the sensor cavity 132A is closed, attenuation of the remaining vibration waveform is enhanced. Thanks to such contradiction, it is possible to detect the ink remaining amount (ink end or ink near-end) or pressure on the basis of the position of the movable member 300.

Liquid Recharging to Liquid Container

In the case of recharging the ink cartridge 100 (for example, ink cartridge 100 which is provided once and recovered from a market), of which all the ink is run out, with ink, ink is charged into the ink pack 107 from the ink discharge member 109. Accordingly, the ink is introduced into the ink detection chamber 200 via the ink outlet 204 (see FIG. 8). For this instance, the ink which has remained in the sensor cavity 132A before ink recharging (at the time of recovering the cartridge) is still maintained in the sensor cavity 132A. Accordingly, it is not needed to charge the sensor cavity 132A with ink via at least the second channel 344, 316, 317 and 318. That is, the ink is forced to pass through the ink detection chamber 200 toward the ink inlet 202 from the ink outlet 204, and thus the ink can be introduced into the ink pack 107 from the ink inlet 202. Moreover, since the ink remaining in the sensor cavity 132A is not likely to come into contact with air, the ink does not deteriorate.

Although the preferred embodiment of the invention is described above in detail, it will be apparent to those skilled in the art that various modification and variations may be made without departing from novel concepts or effects of the invention. Thus, it is intended that the present invention covers the modifications and variations of this invention. For example, if some terms are described at least once in the specification and drawings differently by other terms having broader meanings or by different terms having the same meaning, the original terms may be replaced with the different terms throughout the specification and drawings.

Objects of the detection are to detect liquid pressure besides to detect liquid remaining amount.

Further, an application of the liquid container of the invention may not be limited to an ink cartridge of an ink-jet type recording device. The container can be applied to various liquid consuming devices equipped with liquid ejection heads which discharges a small amount of liquid droplets.

Concrete examples of the liquid consuming device include a device equipped with a color material ejection head used to manufacture a color filter of a liquid crystal display, a device equipped with an electrode material (conductive paste) ejection head used to form electrodes of an organic EL display or a surface discharge display (FED), a device equipped with a living organic material ejection head used to manufacture a biochip, a device equipped with a sample ejection head serving as a precision pipette, a textile printing device, a microdispenser, et al.

In this invention, the term "liquid" means material which can be ejected by the liquid consuming devices. Representative example of the liquid is ink described above with the embodiment of the invention. The liquid also may be substance other than material used in character or image printing, like a liquid crystal. In this invention, the liquid may be a mixture of a liquid and pigments or a mixture of liquid and metal particles besides a liquid as one state of a substance.

What is claimed is:

1. A liquid detection unit comprising:
a liquid detection chamber including a liquid inlet, a liquid outlet, a flexible diaphragm which is displaced according to liquid pressure between the liquid inlet and the liquid outlet, and a detection portion installation member having a surface facing the diaphragm, a volume of the liquid detection chamber changing according to the liquid pressure;
a movable member provided in the liquid detection chamber;
a detection portion including a detection space which communicates with the liquid detection chamber and is separated from the liquid detection chamber by the detection portion installation member, and a piezoelectric-type sensor which causes the detection space to vibrate and detects a remaining vibration waveform of vibrations, the detection portion being provided on the other surface of the detection portion installation member;
an urging member which urges the movable member toward the detection portion installation member; and
a piece of flexible film which is fixed to the liquid detection chamber and holds the detection portion installation member,
wherein the movable member includes a pressure receiving plate attached to the diaphragm and the pressure receiving plate includes a detection space sealing surface facing the surface of the detection portion installation member,
wherein when the liquid pressure is a predetermined value, the diaphragm expands until a volume of the liquid detection chamber becomes a predetermined level and separates the detection space sealing surface of the pressure receiving plate from the surface of the detection portion installation member against urging force of the urging member,
wherein the movable member brings the detection space sealing surface of the pressure receiving plate into contact with the surface of the detection portion installation member by the urging force of the urging member when the liquid pressure becomes lower than the predetermined value and liquid is introduced into the liquid detection chamber for the first time, and displaces the diaphragm to a position at which the volume of the liquid detection chamber becomes smaller than the predetermined volume,
wherein the movable member further includes a first liquid channel which guides the liquid from the liquid inlet to the detection space and a second liquid channel which guides the liquid from the detection space to the liquid outlet, and a part of the second liquid channel is open at a first sealing surface of the movable member,
wherein the liquid detection chamber includes a second sealing surface which seals a part of the second liquid channel by being brought into contact with the first sealing surface of the movable member,
wherein the liquid detection chamber includes an opening through which the surface of the detection portion installation member is exposed and an abutting surface of the detection portion installation member, and wherein when a distance from the first sealing surface of the pressure receiving plate to the detection space sealing surface is defined as L1, and a distance from the second sealing surface of the liquid detection chamber to the abutting surface is defined as L2, a relationship of L1>L2 is satisfied.

2. The liquid detection unit according to claim 1, wherein when a design reference value of the distances L1 and L2 is defined as L0 and a maximum of positive variations of the distance L1 is L01, the liquid detection unit is designed to satisfy a relationship of L0<L1<L0+L01, and wherein when a maximum of negative variations of the distance L2 is defined as −L02 (here, L02<L01), the detection unit is designed to satisfy the relationship of L0−L02<L2<L0, and wherein a relationship L02<L1−L2<L01 is established.

3. The liquid detection unit according to claim 1, wherein when a dimension error of the distance L1 is defined as ΔL1, and a dimension error of the distance L2 is defined as ΔL2 (here, ΔL1 and ΔL2 are positive and negative dimension errors), an expression L1−L2>|ΔL1−ΔL2| is established.

4. The liquid detection unit according to claim 1, wherein the piezoelectric-type sensor detects a value of amplitude of the remaining vibration waveform.

5. The liquid detection unit according to claim 1, wherein the detection portion installation member is provided with two through holes communicating with the liquid detection chamber and the detection space, respectively.

6. The liquid detection unit according to claim 5, wherein the movable member comprises:
an upstream side member extending from the pressure receiving plate to the liquid inlet; and
a downstream side member extending from the pressure receiving plate to the liquid outlet;
wherein the first liquid channel is formed in the upstream side member and the pressure receiving plate and guides the liquid from the liquid inlet to the detection space via one of the through holes formed in the detection portion installation member, and
wherein the second liquid channel is formed in the downstream side member and the pressure receiving plate and guides the liquid from the detection space to the liquid outlet via the other one of the through holes formed in the detection portion installation member.

7. The liquid detection unit according to claim 1, wherein a sealing load which brings the first sealing surface and the second sealing surface into contact with each other is acquired by only the urging force of the urging member.

8. A liquid container comprising:
a liquid containing portion which contains liquid therein; and
the liquid detection unit according to any one of claims 1 to 7, which is connected with the liquid containing portion and in which the liquid in the liquid containing portion is supplied to the liquid inlet.

9. The liquid detection unit according to claim 1, further comprising:
a first guide portion and a second guide portion provided on the liquid detection chamber; and
a first protrusion and a second protrusion that extend from the pressure receiving plate provided on the movable member,
wherein the first guide portion receives the first protrusion and the second guide portion receives the second protrusion.

10. The liquid detection unit according to claim 9, wherein each of the first guide portion and the second guide portion comprises two upstanding portions which protrude up from the liquid detection chamber, and
the first protrusion is received between the two upstanding portions of the first guide portion and the second protrusion is received between the two upstanding portions of the second guide portion.

11. A liquid detection unit comprising:
a casing having a liquid detection chamber;
a sensor member having a cavity;
a sensor base which is provided with a liquid supply hole and a liquid discharge hole communicating with the cavity and supports the sensor member;
a first flexible member which supports the sensor base, attaches the sensor base to the casing so as to face the liquid detection chamber, and seals a first opening of the liquid detection chamber;
an abutting portion provided in the liquid detection chamber and positioning the sensor base by abutting against one surface of the sensor base;
a movable member being movable in the liquid detection chamber;
a second flexible member which supports the movable member and seals a second opening facing the first opening of the liquid detection chamber;
an urging member which urges the movable member toward the sensor base; and
a first liquid channel and a second liquid channel formed when a first sealing surface in the movable member and a second sealing surface provided in the liquid detection chamber of the casing abut against each other and a cavity sealing surface provided in the movable member and one surface of the sensor base abut against each other by the urging force of the urging member, wherein the first liquid channel communicates with the liquid supply hole and the second liquid channel communicates with the liquid discharge hole,
wherein a distance between the first sealing surface of the movable member and the cavity sealing surface is larger than a distance between the second sealing surface of the casing and the abutting portion.

12. The liquid detection unit according to claim 11,
wherein the casing comprises:
a liquid introduction channel through which liquid is introduced into the liquid detection chamber; and
a liquid discharge channel through which the liquid in the liquid detection chamber is discharged,
wherein the first liquid channel includes:
a first through hole provided outside the cavity sealing surface of the movable member;
a second through hole provided on the cavity sealing surface; and
a first communicating channel through which the first and second through holes communicate with each other,
wherein the second liquid channel includes:
a third through hole provided outside the cavity sealing surface of the movable member;
a fourth through hole provided on the cavity sealing surface; and
a second communicating channel through which the third and fourth through holes communicate with each other; and
a third communicating channel which is formed by making the first sealing surface of the movable member abut against the second sealing surface of the casing and which communicates with the third through hole,
wherein the liquid supplied to the liquid detection chamber through the liquid introduction channel sequentially passes through the first through hole, the first communicating channel, and the second through hole, flowing from the liquid supply hole into the cavity, and wherein the liquid discharged from the liquid discharge hole of the cavity sequentially passes through the fourth through hole, the second communicating channel, the third through hole, and the third communicating channel, flowing from the liquid detection chamber into the liquid discharge channel.

13. The liquid detection unit according to claim 11, wherein the urging member includes a cover having an abutting portion which faces the movable member with the second flexible member between them and being supported to the casing in a pivotable manner, and a spring member urging the cover toward the movable member.

14. The liquid detection unit according to claim 11, wherein the casing is equipped with a guide portion which guides movement of the movable member to the detection chamber.

15. The liquid detection unit according to claim 11, wherein the sensor member determines whether a level of remaining liquid is a predetermined level or below by a value of amplitude of a remaining vibration waveform of vibration applied to the cavity.

16. The liquid detection unit according to claim 11, further comprising:
   a liquid introduction member which is provided in a liquid supply channel used for supplying the liquid from a liquid containing portion which contains liquid therein to a liquid ejection device, wherein the liquid introduction member communicates with the liquid introduction channel and introduces the liquid from the liquid containing portion to the liquid detection unit; and
   a liquid discharge member which communicates with the liquid discharge channel and discharges the liquid from the liquid detection unit to the liquid ejection device.

17. The liquid detection unit according to claim 11, further comprising:
   a first guide portion and a second guide portion provided on the liquid detection chamber; and
   a first protrusion and a second protrusion that extend from a pressure receiving plate provided on the movable member,
   wherein the first guide portion receives the first protrusion and the second guide portion receives the second protrusion.

18. The liquid detection unit according to claim 17, further comprising: wherein each of the first guide portion and the second guide portion comprises two upstanding portions which protrude up from the liquid detection chamber, and
   the first protrusion is received between the two upstanding portions of the first guide portion and the second protrusion is received between the two upstanding portions of the second guide portion.

* * * * *